United States Patent [19]
Prater et al.

[11] Patent Number: 4,462,926
[45] Date of Patent: Jul. 31, 1984

[54] THIXOTROPISING AGENTS FOR UNSATURATED POLYESTER RESINS

[75] Inventors: Klaus Prater, Krefeld; Heinz Keesen, Moers, both of Fed. Rep. of Germany

[73] Assignee: Bayer Aktiengesellschaft, Leverkusen, Fed. Rep. of Germany

[21] Appl. No.: 411,519

[22] Filed: Aug. 25, 1982

[30] Foreign Application Priority Data

Sep. 5, 1981 [DE] Fed. Rep. of Germany ....... 3135183

[51] Int. Cl.³ .............................................. B01J 13/00
[52] U.S. Cl. ................................. 252/315.1; 528/288; 528/295.5

[58] Field of Search ............................. 252/182, 315.1; 528/295.5, 288

[56] References Cited

U.S. PATENT DOCUMENTS 3,832,323  8/1974  Ramey et al. ....................... 252/182

Primary Examiner—Lucille M. Phynes
Attorney, Agent, or Firm—Connolly and Hutz

[57] ABSTRACT

Combinations of cyclohexyl amides of saturated fatty acids and oligomeric ester amides are eminently suitable for use as thixotropising agents for unsaturated polyester resins.

3 Claims, No Drawings

THIXOTROPISING AGENTS FOR UNSATURATED POLYESTER RESINS

This invention relates to a thixotropising agent suitable for unsaturated polyester resins and consisting of at least one cyclohexyl amide of a saturated higher fatty acid and at least one other component.

It is known that thickeners and thixotropising agents can be used for preventing coatings freshly applied to vertical or inclined surfaces from running, low-compatibility lacquer binders from separating and heavy fillers from sedimenting or for improving spreadability ("butter effect").

Thickeners and thixotropising agents which have been recommended in the past include, in particular, finely powdered, insoluble inorganic substances, such as highly disperse silica or modified smectite, and also organic compounds, for example, modified unsaturated polyesters, polyester amides, polymeric amides, polyurethanes and cyclohexyl amides of unsaturated higher fatty acids (DE-AS Nos. 1020428, 1182816, 1217611, 1273192, 1569331, and 1745347.

Ideal thixotropising agents should be able to be worked into the resins at the lowest possible temperature (to avoid any risk of colour changes and deterioration in shelf life), should develop their effect as far as possible irrespective of temperature, should show no tendency either towards sedimentation or towards flooding, even in the event of prolonged storage of the thixotropised resins, and should have as little effect as possible upon the mechanical properties of the hardened mouldings produced from the thixotropised resins. Conventional thixotropising agents do not satisfy all these requirements.

The present invention provides a thixotropising agent consisting of (A) at least one cyclohexyl amide of a saturated fatty acid which acid contains at least 10 carbon atoms, and (B) one or more oligomeric ester amides having an average molecular weight $\overline{M}_n$ of from 600 to 3000, preferably from 750 to 2500, a content of carboxylic acid amide (—CO—NH—) groups of from 1.5 to 15% by weight and a content of carboxylate

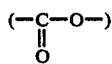

groups of from 2 to 13% by weight, of
(a) at least one unsaturated fatty acid containing at least 10 carbon atoms and/or at least one aliphatic dicarboxylic acid containing at least 10 carbon atoms,
(b) at least one cycloaliphatic diol containing from 6 to 18 carbon atoms, and
(c) at least one aliphatic diamine containing from 2 to 10 carbon atoms, and/or
(C) one or more bis-imides of
(a) at least one aliphatic, cycloaliphatic or aromatic $C_4$–$C_{12}$-dicarboxylic acid forming cyclic imides, and
(b) at least one aliphatic diamine containing from 2 to 10 carbon atoms,
with the proviso that the ratio by weight of components A:B:C is from 1:0.4:1 to 1:2.3:2.5 and preferably from 1:0.7:1 to 1:1.5:2.0 or, in the absence of B or C, the ratio by weight of components A:B or A:C is from 1:0.4 to 1:1.97 and preferably from 1:0.6 to 1:1.5.

The thixotropising agents according to the invention may be added, for example, after the unsaturated polyester has been dissolved in the copolymerisable monomer at temperatures in the range of from 80° to 120° C. In general, a short time will be allowed to pass for the agent to dissolve completely in the polyester resin, followed in the usual way by further cooling. It is assumed that, on cooling, the thixotropising agent crystallises out in very finely divided form and, in so doing, imparts the required thixotropy to the polyester resin.

The fatty acid residues of the cyclohexyl amides A contain from 10 to preferably 30 carbon atoms and are preferably residues of capric acid, lauric acid, myristic acid, palmitic acid, stearic acid, hydroxystearic acid and behenic acids. The suitability of the cyclohexylamides A is known from DE-AS No. 1273192.

Preferred unsaturated fatty acids (B, a) are linseed oil fatty acid, tall oil fatty acid and soya oil fatty acid. Preferred aliphatic dicarboxylic acids (B,a) are sebacic acid, decamethylene dicarboxylic acid and dicarboxylic acids of the type which can be obtained by dimerising unsaturated fatty acids.

The content of monofunctional, unsaturated fatty acids is determined by their function as chain terminators and by the required molecular weight of the ester amide.

Preferred cycloaliphatic diols (B,b) are cyclohexane diols, dimethylol cyclohexanes and perhydrobisphenol-A.

Preferred diamines (B,c) are ethylene diamine, tetramethylene diamine, hexamethylene diamine and decamethylene diamine.

Preferred dicarboxylic acids (C,a) are succinic acid, maleic acid, phthalic acid, tetra- and hexa-hydrophthalic acid and also tetrachlorophthalic acid.

Bis-maleic acid imides will only be used when no problems are caused by their natural colour.

Suitable diamines (C,b) are the same diamines as described in (B,c).

"Unsaturated polyester resins" which may be thixotropised with the agents according to the invention are understood to be mixtures of $\alpha,\beta$-ethylenically unsaturated polyesters in unsaturated monomers copolymerisable therewith.

$\alpha,\beta$-Ethylenically unsaturated polyesters are the usual polycondensation products of at least one $\alpha,\beta$-ethylenically unsaturated dicarboxylic acid generally containing 4 or 5 carbon atoms or ester-forming derivatives, for example anhydrides, thereof with at least one polyhydroxy compound, particularly a dihydroxy compound containing from 2 to 8 carbon atoms, i.e. polyesters of the type described in "Polyesters and their Applications" by J. Bjorksten et al., Reinhold Publishing Corp., New York 1956.

The polyesters generally have acid numbers of from 1 to 100, preferably from 1 to 40, OH-numbers of from 10 to 150 and preferably from 20 to 100, and molecular weights (determined as number averages $\overline{M}_n$) of from about 300 to 5000 and preferably from about 400 to 3000 (as measured by vapour pressure osmometry in dioxane and acetone; in the case of differing values, the lower value is taken as the correct value). The molecular weight of component B is determined in the same way.

In general, styrene is used as the unsaturated monomer copolymerisable with the $\alpha,\beta$-ethylenically unsaturated polyesters.

The agents according to the invention are used in quantities governed by the type of polyester resin and by the required degree of thixotropy. In general, quantities of from 0.5 to 10% by weight and preferably from 0.5 to 1.5% by weight, based on polyester resin (without any other auxiliaries, fillers and reinforcing agents) are effective. A content of 10% by weight of thixotropising agent gives extremely pasty resins.

It is, of course, also possible to stir the agent according to the invention with the polyester resin to form a stock paste which may in turn be used as the thixotropising agent.

The polyester resins thixotropised in accordance with the invention are eminently suitable for the production of coatings, laminates and surfacing compositions.

The addition of 0.1 to 0.5 % by weight, based on oligomeric ester amide B of magnesium oxide—bonded in the form of a salt in the oligomeric ester amide B—improves the wetting of fillers.

EXAMPLES

Production of the ester amide (A) 10 moles of soya oil fatty acid, 10 moles of dimerised fatty acid (molecular weight 590), 3.8 moles of perhydrobisphenol-A and 11.5 moles of ethylene diamine are heated with stirring for 8 hours to 210° C. while nitrogen is introduced and kept at that temperature until the resin has reached an acid number below 20. After solidification, a transparent, dark-coloured tough resin having an acid number of 10, a —CO—N-H—content of 10% by weight and a

content of 3.2% by weight is obtained.

(B) 10 moles of soya oil fatty acid, 10 moles of dimerised fatty acid, 0.58 mole of perhydrobisphenol-A and 0.95 mole of ethylene diamine are condensed in the same way as described in (A). The resin obtained has an acid number of 20, a —CO—NH—content of 8.1% by weight and a

content of 4.8% by weight.

Production of unsaturated polyester resins

Polyesters were produced from the starting components by melt condensation under nitrogen at a temperature of from 180° to 190° C. After the addition of 0.02% by weight of hydroquinone, the polyesters were dissolved in styrene to form 65% by weight solutions.

|  | A | B |
|---|---|---|
| Maleic acid | 1.0 mole | 1.0 mole |
| Norbornene dicarboxylic acid | 1.0 mole | — |
| Phthalic acid | — | 0.61 mole |
| Propylene glycol | — | 1.04 mole |
| Ethylene glycol | 0.9 mole | — |
| Diethylene glycol | 1.2 moles | — |
| Acid number | max. 10 | max. 35 |
| Viscosity, as measured on a 65% by weight solution in styrene at 20° C. | 500 mPas | 1400 mPas |

EXAMPLES 1 TO 5

For the following Examples, the additives indicated in the following Tables were dissolved in the polyester resin at 80° to 90° C., followed by cooling to 20° C. After standing for 24 hours, the viscosity trend was determined in a type RV Brookfield viscometer. The left-hand column indicates the viscosity with increasing rotational speed and the right-hand column the viscosity with decreasing rotational speed.

EXAMPLE 1

Polyester resin: A
Ethylene diamine bis-phthalimide: 0.16% by weight
Stearic acid-N-cyclohexyl amides: 0.33% by weight
Ester amide A: 0.33% by weight
Spindle: No. 6.

| Revolutions per minute | Viscosity | [mPa.s] |
|---|---|---|
| 0.5 | 140,000 | 50,000 |
| 1.0 | 90,000 | 35,000 |
| 2.5 | 52,000 | 16,000 |
| 5.0 | 32,000 | 12,000 |
| 10.0 | 21,000 | 8,000 |
| 20.0 | 13,500 | 6,500 |
| 50.0 | 7,500 | 4,900 |
| 100.0 | 4,700 |  |

EXAMPLE 2

Polyester resin: B
Ethylene diamine bis-phthalimide: 0.33% by weight
Behenic acid-N-cyclohexyl amide: 0.65% by weight
Spindle: No. 6.

| Revolutions per minute | Viscosity | [mPa.s] |
|---|---|---|
| 0.5 | 260,000 | 100,000 |
| 1.0 | 135,000 | 65,000 |
| 2.5 | 78,000 | 38,000 |
| 5.0 | 46,000 | 23,000 |
| 10.0 | 27,500 | 15,500 |
| 20.0 | 16,000 | 10,250 |
| 50.0 | 10,000 | 6,800 |
| 100.0 | 6,250 |  |

EXAMPLE 3

Polyester resin: B
Ethylene diamine tetrahydrophthalic acid bis-imide: 0.33% by weight
Stearic acid-N-cyclohexyl amide: 0.33% by weight
Spindle: No. 6.

| Revolutions per minute | Viscosity | [mPa.s] |
|---|---|---|
| 0.5 | 90,000 | 30,000 |
| 1.0 | 60,000 | 20,000 |
| 2.5 | 38,000 | 14,000 |
| 5.0 | 22,000 | 9,000 |
| 10.0 | 14,000 | 6,500 |
| 20.0 | 9,500 | 5,200 |
| 50.0 | 6,000 | 4,300 |
| 100.0 | 4,200 |  |

EXAMPLE 4

Polyester resin: B
Ethylene diamine bis-phthalimide: 0.65% by weight
Stearic acid-N-cyclohexyl amide: 0.33% by weight Spindle: No. 6.

| Revolutions per minute | Viscosity | [mPa.s] |
| --- | --- | --- |
| 0.5 | 60,000 | 20,000 |
| 1.0 | 37,000 | 17,000 |
| 2.5 | 20,000 | 12,000 |
| 5.0 | 14,000 | 8,000 |
| 10.0 | 9,000 | 6,000 |
| 20.0 | 6,500 | 5,000 |
| 50.0 | 4,200 | 4,000 |
| 100.0 | 3,700 | |

EXAMPLE 5

Polyester resin: A
Ester amide B: 1% by weight
Behenic acid-N-cyclohexyl amide: 1% by weight
Spindle: No. 6.

| Revolutions per minute | Viscosity | [mPa.s] |
| --- | --- | --- |
| 0.5 | 180,000 | 50,000 |
| 1.0 | 110,000 | 30,000 |
| 2.5 | 60,000 | 18,000 |
| 5.0 | 32,000 | 15,000 |
| 10.0 | 19,000 | 9,000 |
| 20.0 | 12,000 | 7,000 |
| 50.0 | 10,000 | 5,200 |
| 100.0 | 4,950 | |

We claim:

1. Thixotropising agents consisting of
(A) at least one cyclohexyl amide of a saturated fatty acid which acid contains at least 10 carbon atoms, and
(B) one or more oligomeric ester amides having an average molecular weight $\overline{M}_n$ of from 600 to 3000, a carboxylic acid amide (—CO—NH—) group content of from 1.5 to 15% by weight and a carboxylate

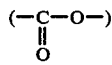

group content of from 2 to 13% by weight, of
   (a) at least one unsaturated fatty acid containing at least 10 carbon atoms and/or at least one aliphatic dicarboxylic acid containing at least 10 carbon atoms,
   (b) at least one cycloaliphatic diol containing from 6 to 18 carbon atoms, and
   (c) at least one aliphatic diamine containing from 2 to 10 carbon atoms, and/or
(C) one or more bis-imides of
   (a) at least one aliphatic, cycloaliphatic or aromatic $C_4$-$C_{12}$-dicarboxylic acid forming cyclic imides, and
   (b) at least one aliphatic diamine containing from 2 to 10 carbon atoms,
with the proviso that the ratio by weight of components A:B:C is from 1:0.4:1 to 1:2.3:2.5 or, in the absence of B or C, the ratio by weight of components A:B or A:C is from 1:0.4 to 1:1.97.

2. Thixotropising agents as claimed in claim 1, characterised in that component B has an average molecular weight $\overline{M}_n$ of from 750 to 2500.

3. Thixotropising agents as claimed in claims 1 or 2, characterised in that the ratio by weight of components A:B:C is from 1:0.7:1 to 1:1.5:2.0 or, in the absence of B or C, the ratio by weight of components A:B or A:C is from 1:0.6 to 1:1.5.

* * * * *